US009823909B1

(12) United States Patent
Kuo et al.

(10) Patent No.: US 9,823,909 B1
(45) Date of Patent: Nov. 21, 2017

(54) PROGRAM CODE CONVERSION FOR CROSS-PLATFORM COMPATIBILITY

(71) Applicant: Amazon Technologies, Inc., Reno, NV (US)

(72) Inventors: Calvin Yue-Ren Kuo, Irvine, CA (US); Jonathan Allen Jamison, Issaquah, WA (US); Dilip Iyer, Issaquah, WA (US); Xiao Yu, Seattle, WA (US); Albert Pitera, Irvine, CA (US); Igor Vodov, Kirkland, WA (US); Therapon Skoteiniotis, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 80 days.

(21) Appl. No.: 14/268,854

(22) Filed: May 2, 2014

(51) Int. Cl.
*G06F 9/45* (2006.01)
*G06F 9/455* (2006.01)
*G06F 9/44* (2006.01)

(52) U.S. Cl.
CPC .............. *G06F 8/41* (2013.01); *G06F 8/43* (2013.01); *G06F 8/52* (2013.01); *G06F 9/4552* (2013.01); *G06F 9/45516* (2013.01); *G06F 8/34* (2013.01)

(58) Field of Classification Search
CPC .............. G06F 8/10–8/77; G06F 9/455–9/548
See application file for complete search history.

(56) References Cited

U.S. PATENT DOCUMENTS

| | | | |
|---|---|---|---|
| 6,438,745 B1 * | 8/2002 | Kanamaru | G06F 9/44521 717/137 |
| 6,854,123 B1 * | 2/2005 | Lewallen | G06F 8/447 717/106 |
| 7,406,699 B2 | 7/2008 | Liu et al. | |
| 7,418,718 B2 | 8/2008 | Liu et al. | |
| 7,458,072 B2 | 11/2008 | Moorthy et al. | |
| 7,530,059 B2 * | 5/2009 | Kielstra | G06F 9/45516 717/148 |
| 7,765,539 B1 * | 7/2010 | Elliott | G06F 8/53 717/145 |

(Continued)

OTHER PUBLICATIONS

Ohrt, Julian et al., "Cross-Platform Development Tools for Smartphone Applications," 2012, pp. 72-79.*

(Continued)

*Primary Examiner* — Thuy Dao
*Assistant Examiner* — Christopher Franco
(74) *Attorney, Agent, or Firm* — Robert C. Kowert; Meyertons, Hood, Kivlin, Kowert & Goetzel, P.C.

(57) ABSTRACT

Methods and systems for program code conversion for cross-platform compatibility are disclosed. A plurality of original function calls are identified in an original program. The original program is targeted to a first platform, and the original function calls comprise invocations of a plurality of functions implemented on the first platform. It is determined whether individual ones of the original function calls correspond to alternative function calls in an index. For the original function calls that correspond to the alternative function calls in the index, the original function calls are replaced with corresponding alternative function calls in a modified program. The modified program is targeted to a second platform, and the alternative function calls comprise invocations of a plurality of functions implemented on the second platform.

20 Claims, 8 Drawing Sheets

(56) References Cited

U.S. PATENT DOCUMENTS

| | | | | |
|---|---|---|---|---|
| 8,312,439 | B2* | 11/2012 | Kielstra | G06F 9/45516 717/148 |
| 8,516,505 | B2 | 8/2013 | Ergan et al. | |
| 8,607,224 | B2 | 12/2013 | Kohler et al. | |
| 2006/0080638 | A1* | 4/2006 | Fiore | G06F 8/71 717/104 |
| 2006/0190934 | A1* | 8/2006 | Kielstra | G06F 9/45516 717/148 |
| 2007/0006184 | A1* | 1/2007 | Andrews | G06F 9/45516 717/136 |
| 2008/0162949 | A1* | 7/2008 | Sato | G06F 21/14 713/194 |
| 2008/0163080 | A1* | 7/2008 | Kooy | G06F 8/38 715/762 |
| 2009/0089767 | A1* | 4/2009 | Daynes | G06F 9/45516 717/148 |
| 2009/0193404 | A1* | 7/2009 | Kielstra | G06F 9/45516 717/148 |
| 2010/0287542 | A1* | 11/2010 | Neft | G06F 8/31 717/140 |
| 2011/0202932 | A1* | 8/2011 | Borghini | G06F 9/54 719/321 |
| 2011/0265067 | A1* | 10/2011 | Schulte | G06F 9/45516 717/148 |
| 2014/0047413 | A1* | 2/2014 | Sheive | G06F 8/33 717/110 |
| 2015/0057078 | A1* | 2/2015 | Moore | A63F 13/60 463/29 |
| 2015/0339137 | A1* | 11/2015 | Andrus | G06F 9/45516 717/148 |
| 2016/0077850 | A1* | 3/2016 | Andrus | G06F 9/45537 717/139 |

OTHER PUBLICATIONS

Smith, James E. et al., "The Architecture of Virtual Machines," 2005, pp. 32-38.*

Palmieri, Manuel et al., "Comparison of Cross-Platform Mobile Development Tools," 2012, pp. 179-186.*

Hong, Luhe et al., "The Application Guide of Mixed Programming between MATLAB and Other Programming Languages," 2010, pp. 185-189.*

Le Goaer, Olivier et al., "Yet another DSL for cross-platforms mobile development," 2013, pp. 28-33.*

Lindstrom, Lars et al., "Reducing Test Program Costs Through ATML-based Requirements Conversion and Code Generation," 2013, pp. 1-5.*

* cited by examiner

PROGRAM CODE CONVERSION FOR CROSS-PLATFORM COMPATIBILITY

BACKGROUND

Data centers housing significant numbers of interconnected computing systems have become commonplace, including data centers that are operated by businesses to provide computing resources to customers. Examples of such large-scale systems include online merchants and marketplaces, internet service providers, corporate networks, cloud computing services, web-based hosting services, etc. These entities may maintain computing resources in the form of large numbers of computing devices (e.g., thousands of hosts) that are hosted in geographically diverse locations.

Servers backed by such systems may provide online marketplaces or other electronic commerce systems that offer goods and/or services to consumers over one or more networks. For instance, a software marketplace may provide many different applications or other items of software for purchase by consumers and/or download to client devices. The applications may be provided to the software marketplace by third-party developers. After an approval process in some cases, the applications may be listed on the marketplace such that consumers may find particular applications and initiate download transactions. Different software marketplaces may be aimed at different computing platforms, such as different categories of mobile devices and/or different families of operating systems. An application written for one such platform may not be compatible with devices that implement other platforms.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for program code conversion for cross-platform compatibility are described. Using the methods and systems as described herein, program code targeted at one platform may be automatically converted for execution on another platform. In particular, code sequences that include function calls to an application programming interface (API) on the first platform may be identified, and the identified sequences may be replaced or augmented by code sequences that call equivalent functions on the second platform. In one embodiment, the program code may be modified in this manner through static code conversion, e.g., after the program has been submitted to a software marketplace by a developer but before the program has been distributed to end users. In one embodiment, the program code may be modified in this manner through dynamic code conversion, e.g., when the program is executed on a client device. In one embodiment, the program code may be modified in this manner through the use of an abstraction layer during the development of the code. In this manner, an application may be automatically modified to execute on different platforms with little to no effort required on the part of the developer.

Figure 1:
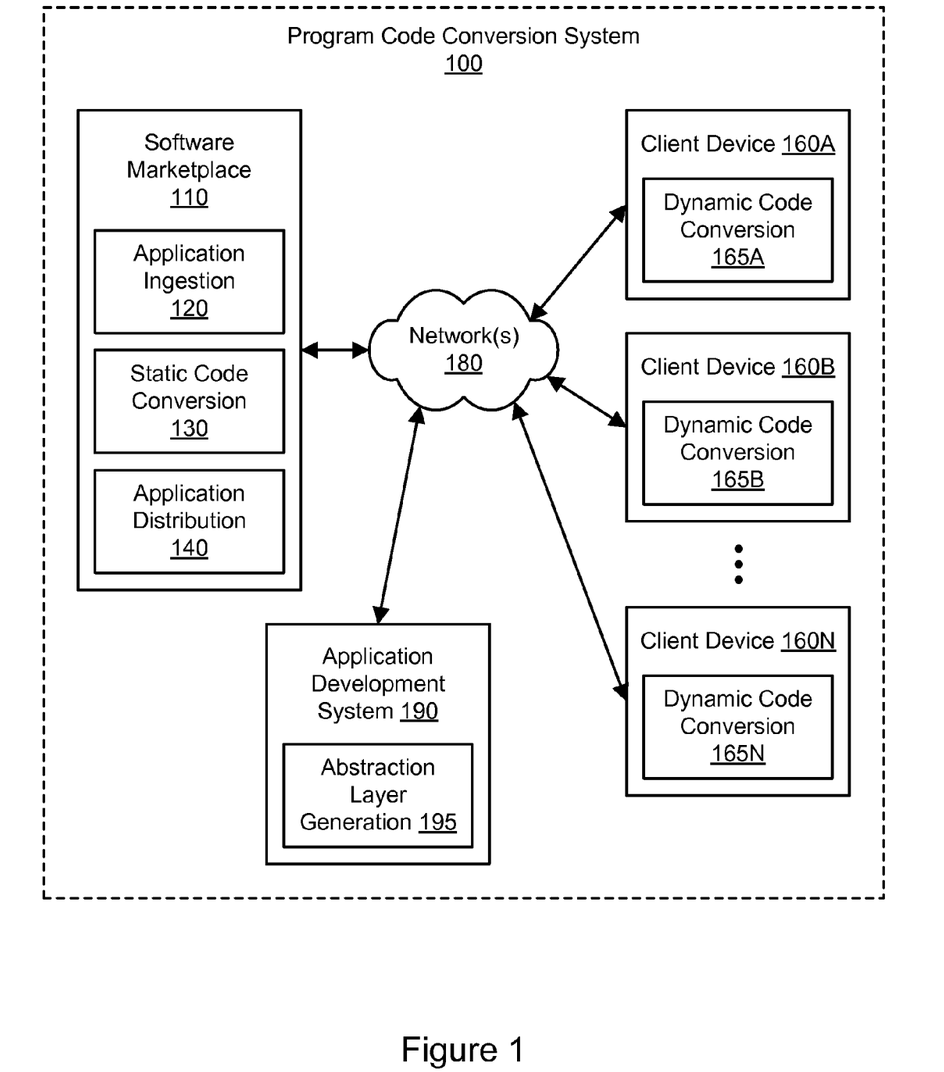
FIG. 1 illustrates an example system environment for program code conversion for cross-platform compatibility, according to one embodiment.

FIG. 1 illustrates an example system environment for program code conversion for cross-platform compatibility, according to one embodiment. The example system environment may implement a program code conversion system 100. The program code conversion system 100 may include at least one software marketplace 110 and a plurality of client devices such as client devices 160A and 160B through 160N. Although one software marketplace 110 and three client devices 160A, 160B, and 160N are illustrated for purposes of example, it is contemplated that any suitable number and configuration of software testing servers and client devices may be used with the program code conversion system 100. In one embodiment, the program code conversion system 100 may include an application development system 190. The application development system 190 may be operated by a developer to produce applications to be listed on the software marketplace 110 for potential download to any of the client devices 160A-160N. Although one application development system 190 is illustrated for purposes of example, it is contemplated that any suitable number and configuration of application development systems may be used with the program code conversion system 100. The program code conversion system 100 may use one or more networks 180 and interconnections to couple the various components. Elements of the program code conversion system 100 may be located in any suitable location relative to one another.

In one embodiment, the software marketplace 110 may offer different applications or other items of software to a variety of clients such as client devices 160A-160N. The software marketplace may also be referred to herein as an application store or app store. The software marketplace may offer an application selection interface to the client devices 160A-160N. In one embodiment, the application selection interface may be implemented using a marketplace application, an instance of which may run on each of the client devices 160A-160N. Using the application selection interface provided by the marketplace application, any of the client devices 160A-160N may select and download suitable applications from the software marketplace over the network(s) 180. The software marketplace may include any suitable authentication and/or payment functionalities to provide secure purchasing and downloading of selected applications.

Various applications may be provided to the software marketplace 110 by developers of the applications. For example, one or more applications may be provided using any suitable interface between the application development system 190 and the software marketplace 110. As used herein, the term "application" generally includes any suitable item of software or software package. Each application may include a set of program code expressed using any suitable programming language(s), including higher-level programming languages, bytecode (or other machine language for a virtual machine), and/or machine language.

The software marketplace 110 may include a plurality of components that are configured to perform various tasks, such as receiving applications submitted by developers, potentially modifying the program code of the applications, and providing the applications (original and/or modified) to the clients 160A-160N. For example, the software marketplace 110 may include application ingestion functionality 120, static code conversion functionality 130, and application distribution functionality 140. The software marketplace 110 may comprise one or more computing devices, any of which may be implemented by the example computing device 3000 illustrated in FIG. 8. In various embodiments, the functionality of the different services, components, and/or modules of the software marketplace 110 (e.g., application ingestion functionality 120, static code conversion functionality 130, and application distribution functionality 140) may be provided by the same computing device or by different computing devices. If any of the various components are implemented using different computing devices, then the respective computing devices may be communicatively coupled, e.g., via a network. Each of the application ingestion functionality 120, static code conversion functionality 130, and application distribution functionality 140 may represent any combination of software and hardware usable to perform their respective functions, as discussed as follows.

In some embodiments, the software marketplace 110 may be implemented using one or more virtual compute instances and/or one or more physical compute instances. The virtual compute instances and/or physical compute instances may be provisioned and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 8.

In one embodiment, an application may be generated using the application development system 190. The application development system 190 may comprise one or more computing devices, any of which may be implemented by the example computing device 3000 illustrated in FIG. 8. The application development system 190 may include a plurality of components that are configured for entry of program code (e.g., by a developer) and generation of an executable application based on the entered program code. For example, the application development system 190 may include a programming environment and a compiler. In one embodiment, the application development system 190 may include an abstraction layer generation functionality 195. As will be described in greater detail below, the abstraction layer generation functionality 195 may generate an abstraction layer to permit cross-platform compatibility of an application. The abstraction layer may include sequences of program code that invoke equivalent functionality on multiple target platforms.

As used herein, the term "platform" or "computing platform" generally refers to the hardware architecture, operating system software, and/or runtime libraries available on a computing device. A platform may also refer to an execution environment, such as a virtual machine that executes bytecode. Accordingly, an application that is targeted to a particular platform may be designed to execute on hardware that is compatible with the platform and also to work with an operating system and/or runtime libraries that are compatible with the platform. An application that is developed for one platform may not necessarily be compatible with another platform. For example, if a first mobile device runs a particular operating system and a second mobile device also runs the particular operating system, but different APIs or other runtime libraries are available to programs on the first mobile device than on the second mobile device, then the two mobile devices may be said to implement different platforms. Similarly, if a first mobile device implements a particular virtual machine and a second mobile device also implements the particular virtual machine, but different APIs or other runtime libraries are available to programs on the first mobile device than on the second mobile device, then the two mobile devices may be said to implement different platforms. For example, different mobile platforms may implement a similar virtual machine but may offer different but equivalent libraries for in-app purchasing, real-world map generation, push notifications, etc. Using the systems and methods described herein, an application may be automatically and programmatically converted for execution on a different platform than the platform for which the application was originally designed.

In one embodiment, the application ingestion functionality 120 may receive applications submitted by developers. Accordingly, the application ingestion functionality 120 may implement any suitable interface to permit developers to submit applications to the software marketplace 110, e.g., from the application development system 190. An application received by the application ingestion functionality 120 may be targeted to a single platform or may be targeted to multiple platforms using an abstraction layer. In one embodiment, the application ingestion functionality 120 may require approval of submitted applications before the applications may be listed for download by the client devices 160A-160N. The approval may include programmatic analysis and/or manual analysis to verify that a submitted application conforms to standards set by the operator of the software marketplace 110.

In one embodiment, the static code conversion functionality 130 may convert an application targeted to a first platform for execution on a second platform. As will be described in greater detail below, the program code of an application may be analyzed to identify code sequences that invoke API calls or other functionality associated with the first platform but not with the second platform. The identified code sequences may be replaced with code sequences that invoke equivalent API calls or other functionality associated with the second platform. In this manner, the static code conversion functionality 130 may generate a modified application based on an original application. The static code conversion functionality 130 may analyze and modify an application using programmatic analysis. As used herein, the term "programmatic analysis" generally includes the execution of computer program instructions to analyze and/or modify the program code of an application in an automatic manner, e.g., without requiring additional user input after the analysis has been initiated.

In one embodiment, the application distribution functionality 140 may distribute applications to the client devices 160A-160N. Each of the client devices 160A-160N may comprise one or more computing devices, any of which may be implemented by the example computing device 3000 illustrated in FIG. 8. In one embodiment, each of the client devices 160A-160N may connect to the software marketplace 110 over the network(s) 180, e.g., using a local marketplace application executing on each of the client devices 160A-160N. Using an application selection interface provided by the local marketplace application, any of the client devices 160A-160N may select an application for downloading to the storage of the respective client device.

In one embodiment, one of the client devices 160A-160N may select, download, and install an application that has been modified using the abstraction layer generation functionality 195 for compatibility with the downloading device. As will be described in greater detail below, an application modified with an abstraction layer may be executed on a client device even if the application was originally targeted to a different platform than the platform implemented by the client device. In one embodiment, one of the client devices 160A-160N may select, download, and install an application that has been modified using the static code conversion functionality 130 for compatibility with the downloading device. As will be described in greater detail below, an application modified using the static code conversion functionality 130 may be executed on a client device even if the application was originally targeted to a different platform than the platform implemented by the client device.

In one embodiment, one of the client devices 160A-160N may select, download, and install an application that has not been modified for cross-platform compatibility using the abstraction layer generation functionality 195 or the static code conversion functionality 130. In such circumstances, the program code of the application may be modified at runtime for compatibility with the client device. In one embodiment, each of the client devices 160A-160N may include a dynamic code conversion functionality, such as dynamic code conversion functionality 165A on client device 160A, dynamic code conversion functionality 165B on client device 160B, and dynamic code conversion functionality 165N on client device 160N. Each instance of the dynamic code conversion functionality may automatically convert an application targeted to a first platform for execution on a second platform, where the client device implements the second platform but not the first platform. As will be described in greater detail below, the program code of an application may be analyzed to identify code sequences that invoke API calls or other functionality associated with the first platform but not with the second platform. When the application is first executed on the client device, the identified code sequences may be replaced with code sequences that invoke equivalent API calls or other functionality associated with the second platform. The original, unmodified application may be stored in a memory of the client device, and the replacement code sequences may be cached on the device for subsequent execution of the application.

Figure 2:
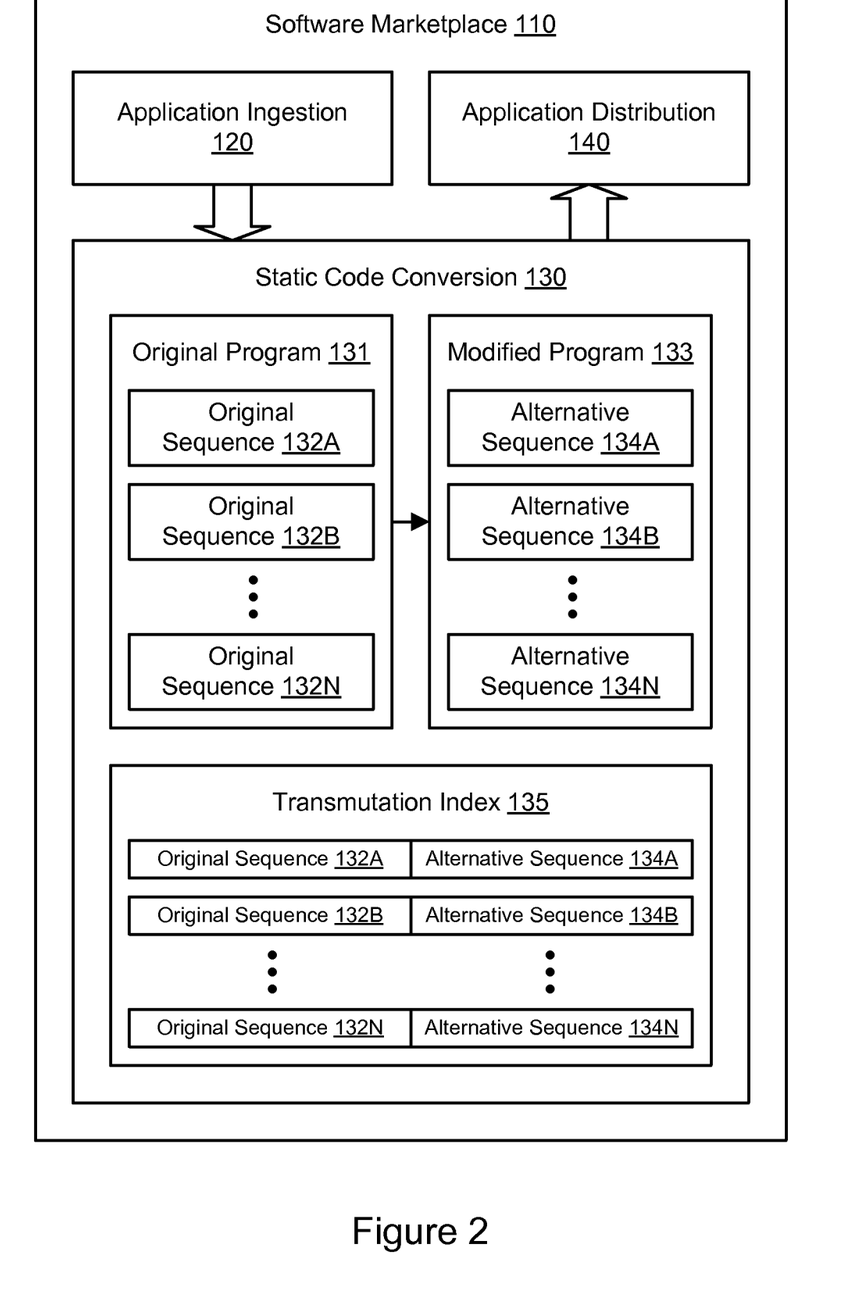
FIG. 2 illustrates an example system environment for program code conversion for cross-platform compatibility, including static code conversion, according to one embodiment.

FIG. 2 illustrates an example system environment for program code conversion for cross-platform compatibility, including static code conversion, according to one embodiment. As discussed above, the static code conversion functionality 130 may convert an application targeted to a first platform for execution on a second platform. After an application is received from a developer using the application ingestion functionality 120, the application may be analyzed and modified using the static code conversion functionality 130. A modified application may be generated based on the modified program code, and the modified application may be listed on the software marketplace 110 (potentially by performing further aspects of the ingestion process) or otherwise distributed to clients using the application distribution functionality 140.

In various embodiments, the program code of an application may be analyzed using a program code analysis framework to identify sequences of source code to be changed for cross-platform compatibility. The program code of an application may represent instructions written in one or more computer languages that, when executed, cause a computing device to perform the computer instructions. The one or more computer languages may include, for example, a human-readable computer language, machine language or bytecode, and/or any intermediate level language. For example, an application file may comprise an Application Package File (APK) or any other packaged file that may comprise source code, resources, assets, certificates, libraries, and/or manifest files that may be used in installing and/or executing the application on one or more devices. Application program code may be "unpacked" from a packaged application file. In one embodiment, the program code may be converted from a first type to a second type (e.g., a first language to a second language, a first language format to a second language format, etc.).

To inspect the source code or an intermediate code (e.g., bytecode) of the application, a conversion of the source code from a first type to a second type may be performed. Accordingly, the source code may be converted from an unusable first type to a usable second type using a conversion engine or similar component. For example, the source code of an application may comprise a first type of virtual machine instructions for execution of the application in a DALVIK™ virtual machine. The machine instructions may be converted to a second type (e.g., JAVA™ bytecode or a higher-level programming language) for inspection and analysis.

Accordingly, the original program 131 may converted to a format suitable for analysis and modification, hereinafter referred to as an intermediate format. The intermediate format of the original program 131 may be analyzed to locate sequences of code that invoke functions associated with a first platform. The located sequences may be referred to herein as original sequences. As shown in the example of FIG. 2, the original program 131 may include original sequence 132A and original sequence 132B through original sequence 132N, along with other sequences (not shown) that do not invoke functions associated with the first platform. Although three original sequences 132A-132N are illustrated for purposes of example, it is contemplated that the original program 131 may include any suitable number of code sequences that invoke functions associated with the first platform. In one embodiment, the code sequences that are identified in the intermediate format of the original program 131 may represent sequences of bytecode that are executable on a virtual machine. The code sequences may be identified using any suitable technique, such as by identifying bytecode signatures for particular calls. The functions may represent API calls or other services that are associated with a first platform and that may not be available on a second platform. The first platform may represent the platform to which the original program 131 is targeted by the developer. The second platform may represent a platform that is served by the software marketplace 110 and/or a platform implemented by one or more of the client devices 160A-160N instead of the first platform.

In one embodiment, the static code conversion functionality 130 may reference a transmutation index 135 to find an alternative sequence of program code for each of the original sequences 132A-132N. The transmutation index 135 may indicate correspondences between sequences of code that invoke functions of the first platform and sequences of code that invoke equivalent functions of the second platform. The transmutation index 135 may also include details as to how one sequence of code may be replaced with another sequence of code. The transmutation index 135 may be organized based on any suitable key(s), such as a name or other identifier of a function call in the original sequences. As shown in the example of FIG. 2, the transmutation index 135 may indicate a correspondence between original sequence 132A and alternative sequence 134A, a correspondence between original sequence 132B and alternative sequence 134B, and a correspondence between original sequence 132N and alternative sequence 134N. Each of the alternative sequences 134A-134N may be a sequence of program code that invokes one or more functions (e.g., representing API calls or other services) available on the second platform. The alternative sequences 134A-134N may be expressed in the same programming language (or format thereof, such as the intermediate format) as the original sequences 132A-132N.

In generating a modified program 133 based on the original program 131, the static code conversion functionality 130 may replace each of the original sequences 132A-132N with the corresponding alternative sequence identified using the transmutation index 135. In some cases, one or more parameters passed to a function in an original sequence may also be converted. For example, the type and/or format of a parameter may be changed for compatibility with the second platform, or a parameter may be coerced into a wrapper type. In some cases, an original sequence may lack a corresponding alternative sequence in the index 135; such an original sequence may be replaced by a call to one or more adapter libraries. If neither an alternative sequence nor an adapter library is available to ensure compatibility with the second platform, then the static code conversion functionality 130 may report that the original program 131 cannot be converted.

In one embodiment, the static code conversion functionality 130 may convert the modified program 133 from the intermediate format back to the format in which the original program 131 was received by the software marketplace 110. The static code conversion functionality 130 may take any suitable steps to generate an executable or interpretable application based on the modified program code 133, including re-linking alternative libraries and re-compiling resources. The modified application may then be distributed to one or more of the client devices 160A-160N, potentially following another ingestion process at the software marketplace 110. In one embodiment, the modified application may need no further modification in order to run on a client device that implements the second platform.

Figure 3:
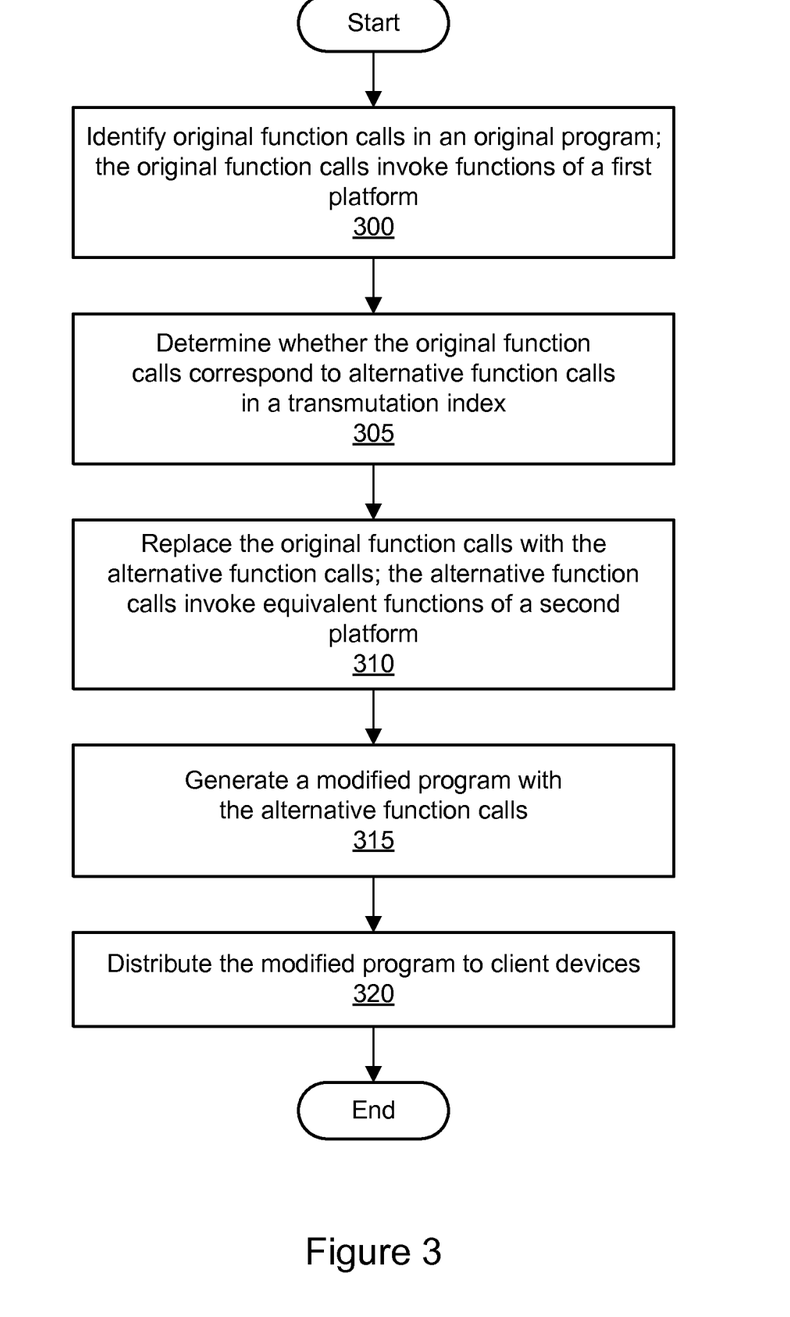
FIG. 3 is a flowchart illustrating a method for program code conversion for cross-platform compatibility, including static code conversion, according to one embodiment.

FIG. 3 is a flowchart illustrating a method for program code conversion for cross-platform compatibility, including static code conversion, according to one embodiment. As shown in 300, one or more original function calls may be identified in an original program. The original function calls may invoke functions of a first platform (e.g., APIs available on the first platform). In one embodiment, the original program may be converted to an intermediate format prior to the operation shown in 300.

As shown in 305, it may be determined whether each of the original function calls corresponds to an alternative function call in a transmutation index. Each function call may be represented as a program code sequence in the transmutation index, where the sequence includes the function call (e.g., to an API or other service associated with a particular platform). If an alternative function call cannot be found in the index, an adapter library may be determined for one of the original function calls. In one embodiment, the static code conversion may fail if neither an alternative function call nor an adapter library can be found for any of the original function calls.

As shown in 310, the original function calls may be replaced by the corresponding alternative function calls in the program code. The alternative function calls may invoke equivalent functions of a second platform (e.g., APIs available on the second platform). In some cases, the original function calls may be replaced by invocations of adapter libraries in the program code. As shown in 315, a modified program having the alternative function calls (and optionally any adapter libraries) may be generated, e.g., by converting the modified code from the intermediate format to the original format and recompiling the code. As shown in 320, the modified program may be distributed to and executed by client devices, e.g., client devices that implement the second platform.

Figure 4:
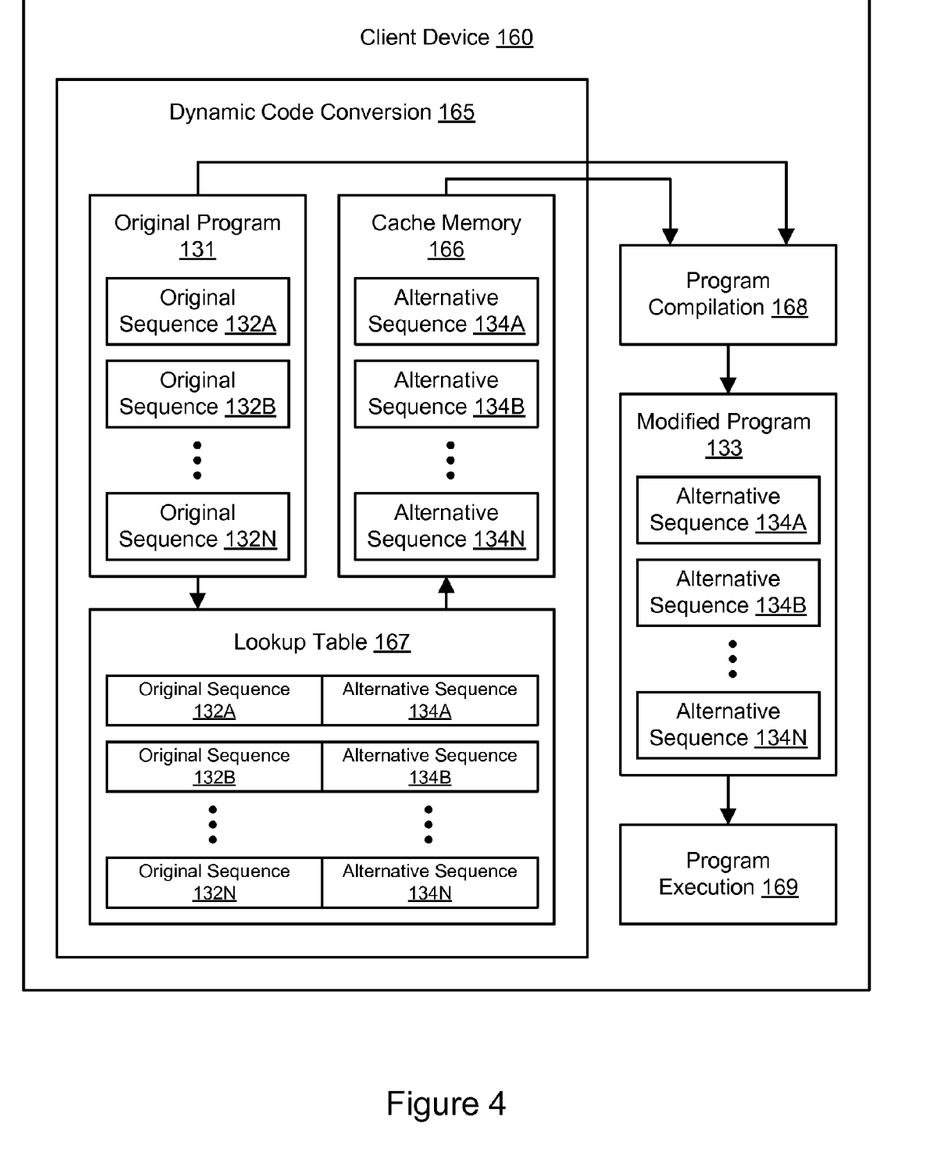
FIG. 4 illustrates an example system environment for program code conversion for cross-platform compatibility, including dynamic code conversion, according to one embodiment.

FIG. 4 illustrates an example system environment for program code conversion for cross-platform compatibility, including dynamic code conversion, according to one embodiment. A client device 160 may be implemented as discussed above with respect to client devices 160A-160N, including a dynamic code conversion functionality 165. In one embodiment, the dynamic code conversion functionality 165 may be a component of a virtual machine on the client device 160. An original program 131 may be distributed to the client device 160. When the original program 131 is executed (e.g., when execution is initiated) or installed, the dynamic code conversion functionality 165 may perform steps to ensure the compatibility of the program with the client device 160. In particular, the dynamic code conversion functionality 165 may ensure that a program targeted to a first platform may be executed on a client device 160 that implements a second platform instead of the first platform.

In various embodiments, after execution of the original program 131 is initiated or when the original program 131 is installed on the client device 160, the dynamic code conversion functionality 165 may inspect the original program 131 for function calls that are implemented on the first platform but not on the client device 160. Accordingly, the dynamic code conversion functionality 165 may locate sequences of code that invoke functions associated with the first platform. The located sequences may be referred to herein as original sequences. As shown in the example of FIG. 4, the original program 131 may include original sequence 132A and original sequence 132B through original sequence 132N, along with other sequences (not shown) that do not invoke functions associated with the first platform. Although three original sequences 132A-132N are illustrated for purposes of example, it is contemplated that the original program 131 may include any suitable number of code sequences that invoke functions associated with the first platform. In one embodiment, the code sequences that are identified in the original program 131 may represent sequences of bytecode that are executable on a virtual machine. The code sequences may be identified using any suitable technique, such as by identifying bytecode signatures for particular calls. The functions may represent API calls or other services that are associated with the first platform and that may not be available on the second platform. The first platform may represent the platform to which the original program 131 is targeted by the developer. The second platform may represent a platform that is implemented by the client devices 160 instead of the first platform.

In one embodiment, the dynamic code conversion functionality 165 may reference any suitable data source (such as a local variation of the transmutation index 135) to find an alternative sequence of program code for each of the original sequences 132A-132N. For example, a lookup table 167 may indicate correspondences between sequences of code that invoke functions of the first platform and sequences of code that invoke equivalent functions of the second platform. In one embodiment, the lookup table 167 may perform the same function as the transmutation index 135 and be implemented in a similar manner. As shown in the example of FIG. 4, the lookup table 167 may indicate a correspondence between original sequence 132A and alternative sequence 134A, a correspondence between original sequence 132B and alternative sequence 134B, and a correspondence between original sequence 132N and alternative sequence 134N. Each of the alternative sequences 134A-134N may be a sequence of program code that invokes one or more functions (e.g., representing API calls or other services) available on the second platform. The alternative sequences 134A-134N may be expressed in the same language (e.g., bytecode) as the original sequences 132A-132N. The lookup table 167 may be kept up-to-date on client devices by pushing updates to the devices at appropriate intervals, e.g., using the software marketplace 110.

A virtual machine on the client device 160 may include a program compilation functionality 168. Using the program compilation functionality 168, the client device 160 may perform a replacement of the original sequences 132A-132N with the corresponding alternative sequences 134A-134N and a compilation of the combined program code. As a result, the client device 160 may produce a modified program 133 that includes the alternative sequences 134A-134N in place of the corresponding original sequences 132A-132N. In one embodiment, the program compilation functionality 168 may include a just-in-time compilation functionality that compiles the modified program 133 immediately prior to execution of the program. In one embodiment, the program compilation functionality 168 may compile the modified program 133 at an earlier point in time, e.g., at the installation of the original program 131 on the client device 160. Using a program execution functionality 169 (e.g., implemented as a component of a virtual machine), the client device 160 may execute the modified program 133. Execution of the modified program 133 may include execution of one or more of the alternative sequences 134A-134N.

The original program 131 may be stored in a memory of the client device 160 before and after the execution of the modified program 133. In one embodiment, the dynamic code conversion functionality 165 may also place the alternative sequences 134A-134N that correspond to the original sequences 132A-132N in a cache memory 166. The cache memory may be managed by a virtual machine. In one embodiment, a delta-based algorithm may be used such that the cache memory 166 stores only the classes that have had code sequence (e.g., bytecode) replacement performed. In the cache memory 166, the alternative sequences 134A-134N may be associated with the original program 131 using any suitable techniques, such as by marking them with an identifier of the original program 131 and indicating the classes they may replace in the original program 131. When execution of the original program 131 is initiated again on the client device, the process of generating the modified program 133 may be simplified by retrieving the alternative sequences 134A-134N from the cache memory 166 and again performing the just-in-time replacement and just-in-time compilation using the classes from the cache memory 166.

Figure 5:
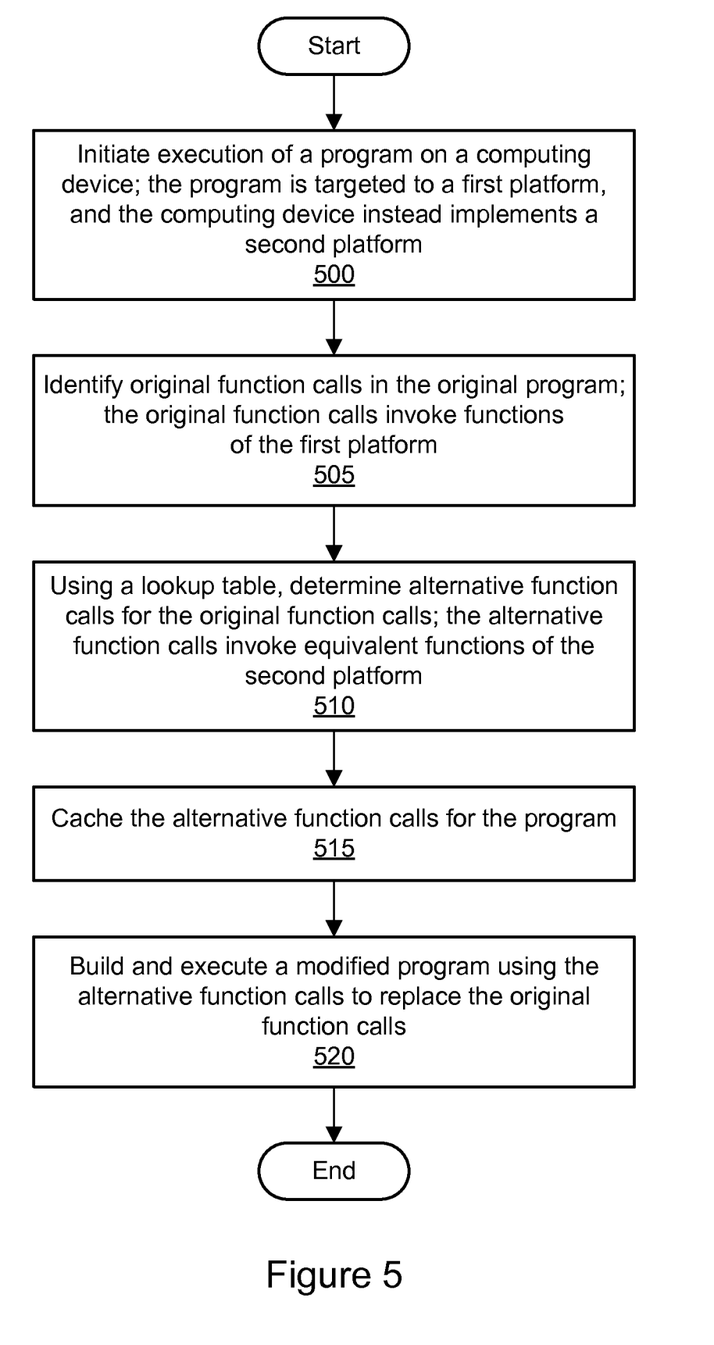
FIG. 5 is a flowchart illustrating a method for program code conversion for cross-platform compatibility, including dynamic code conversion, according to one embodiment.

FIG. 5 is a flowchart illustrating a method for program code conversion for cross-platform compatibility, including dynamic code conversion, according to one embodiment. As shown in 500, execution of an original program may be initiated on a computing device. The original program may be targeted to a first platform, and the computing device may implement a second platform rather than the first platform.

As shown in 505, one or more original function calls may be identified in the original program. The original function calls may invoke functions of a first platform (e.g., APIs available on the first platform). As shown in 510, alternative function calls corresponding to the original function calls may be determined. The alternative function calls may invoke equivalent functions of a second platform (e.g., APIs available on the second platform). The alternative function calls may be determined using any suitable technique, such as reference to a lookup table, index, or other data source.

As shown in 515, the alternative function calls may be cached. On subsequent execution of the original program, the alternative function calls may be retrieved from the cache to avoid the operations shown in steps 505 and/or 510. As shown in 520, a modified program that uses the alternative function calls may be built and executed. A just-in-time compilation process may be used to compile the program with the alternative function calls substituted for the original function calls. In this manner, an original program targeted to a first platform may be automatically converted for execution on a second platform.

Figure 6:
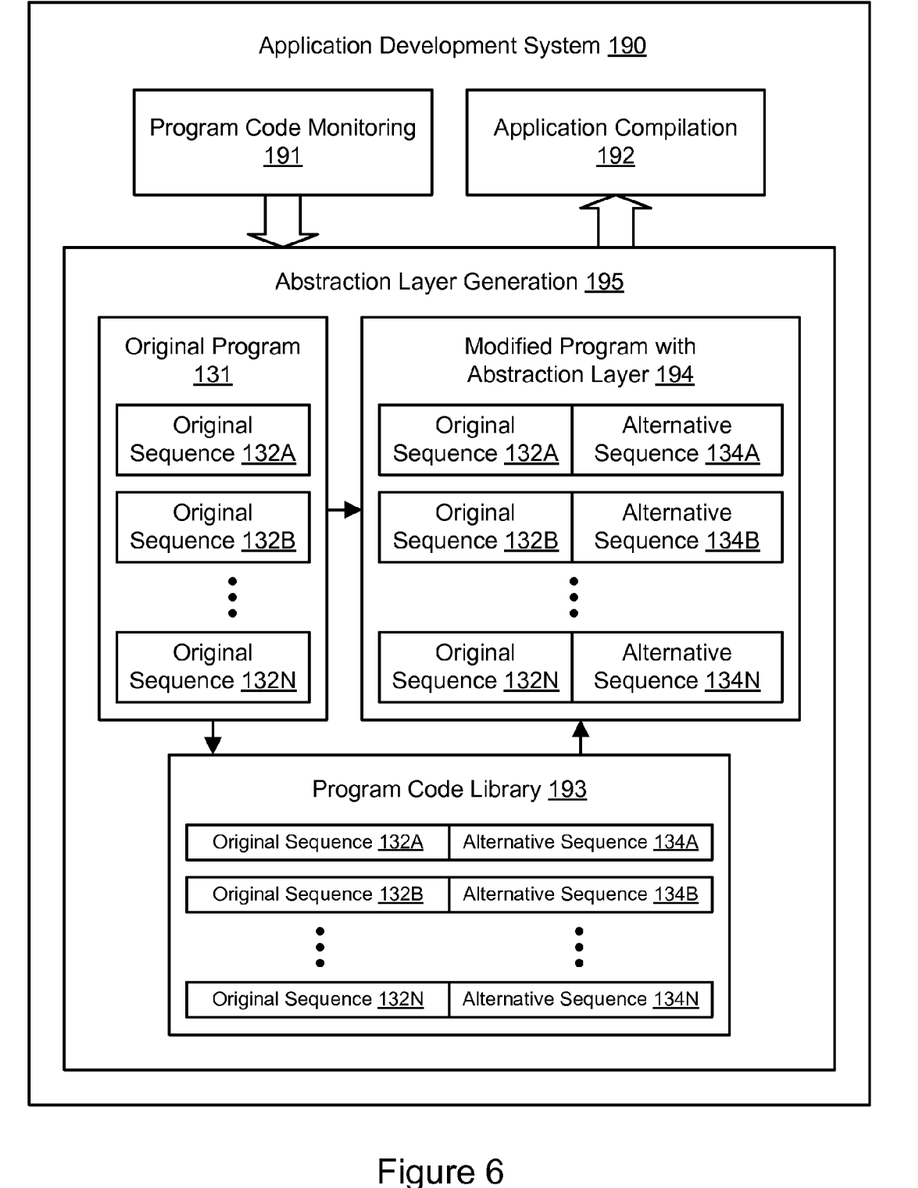
FIG. 6 illustrates an example system environment for program code conversion for cross-platform compatibility, including use of an abstraction layer, according to one embodiment.

FIG. 6 illustrates an example system environment for program code conversion for cross-platform compatibility, including use of an abstraction layer, according to one embodiment. An application development system 190 may implement an environment for program development. A program code monitoring functionality 191 may detect the presence of particular function calls in an original program 131. In one embodiment, the program code monitoring functionality 191 may detect the function calls as they are entered or added by a developer, e.g., in a high-level language. The detected calls may invoke functions associated with a first platform. Sequences of program code with the detected calls may be referred to herein as original sequences. As shown in the example of FIG. 6, the original program 131 may include original sequence 132A and original sequence 132B through original sequence 132N, along with other sequences (not shown) that do not invoke functions associated with the first platform. Although three original sequences 132A-132N are illustrated for purposes of example, it is contemplated that the original program 131 may include any suitable number of code sequences that invoke functions associated with the first platform. The functions may represent API calls or other services that are associated with a first platform and that may not be available on a second platform. The first platform may represent the platform to which the original program 131 is targeted by the developer. The second platform may represent a platform that is served by the software marketplace 110 and/or a platform implemented by one or more of the client devices 160A-160N instead of the first platform.

In one embodiment, the abstraction layer generation functionality 195 may reference any suitable data source, such as a program code library 193, to find an alternative sequence of program code for each of the original sequences 132A-132N. The program code library 193 may indicate correspondences between sequences of code that invoke functions of the first platform and sequences of code that invoke equivalent functions of the second platform. The program code library 193 may also include details as to how one sequence of code may be replaced with another sequence of code. The program code library 193 may be organized based on any suitable key(s), such as a name or other identifier of a function call in the original sequences. As shown in the example of FIG. 6, the program code library 193 may indicate a correspondence between original sequence 132A and alternative sequence 134A, a correspondence between original sequence 132B and alternative sequence 134B, and a correspondence between original sequence 132N and alternative sequence 134N. Each of the alternative sequences 134A-134N may be a sequence of program code that invokes one or more functions (e.g., representing API calls or other services) available on the second platform. The alternative sequences 134A-134N may be expressed in the same programming language as the original sequences 132A-132N.

The abstraction layer generation functionality 195 may generate an abstraction layer to permit cross-platform compatibility of an application. The abstraction layer may include sequences of program code that invoke equivalent functionality on multiple target platforms. Accordingly, in generating a modified program 194 based on the original program 131, the abstraction layer generation functionality 195 may replace each of the original sequences 132A-132N with an abstraction layer that includes both the original sequence and the corresponding alternative sequence. In one embodiment, the developer may be prompted to accept or reject the use of the abstraction layer. Based on user input either accepting or rejecting the abstraction layer, the program may be modified or left unchanged.

Using an application compilation functionality 192, the modified program 194 with the abstraction layer may be compiled into an executable form. The compiled application may then be submitted to the software marketplace 110 and/or executed on one of the client devices 160A-160N. When the compiled application with the abstraction layer is executed on a client device, either the original sequences or the alternative sequences may be selected and executed based on the platform implemented by the client device. Accordingly, further code conversion (e.g., static code conversion, as discussed with reference to FIGS. 2 and 3, or dynamic code conversion, as discussed with reference to FIGS. 4 and 5) may be unnecessary for a modified program 194 with an abstraction layer. In this manner, the use of an abstraction layer may provide runtime compatibility across multiple platforms with no further code conversion.

Figure 7:
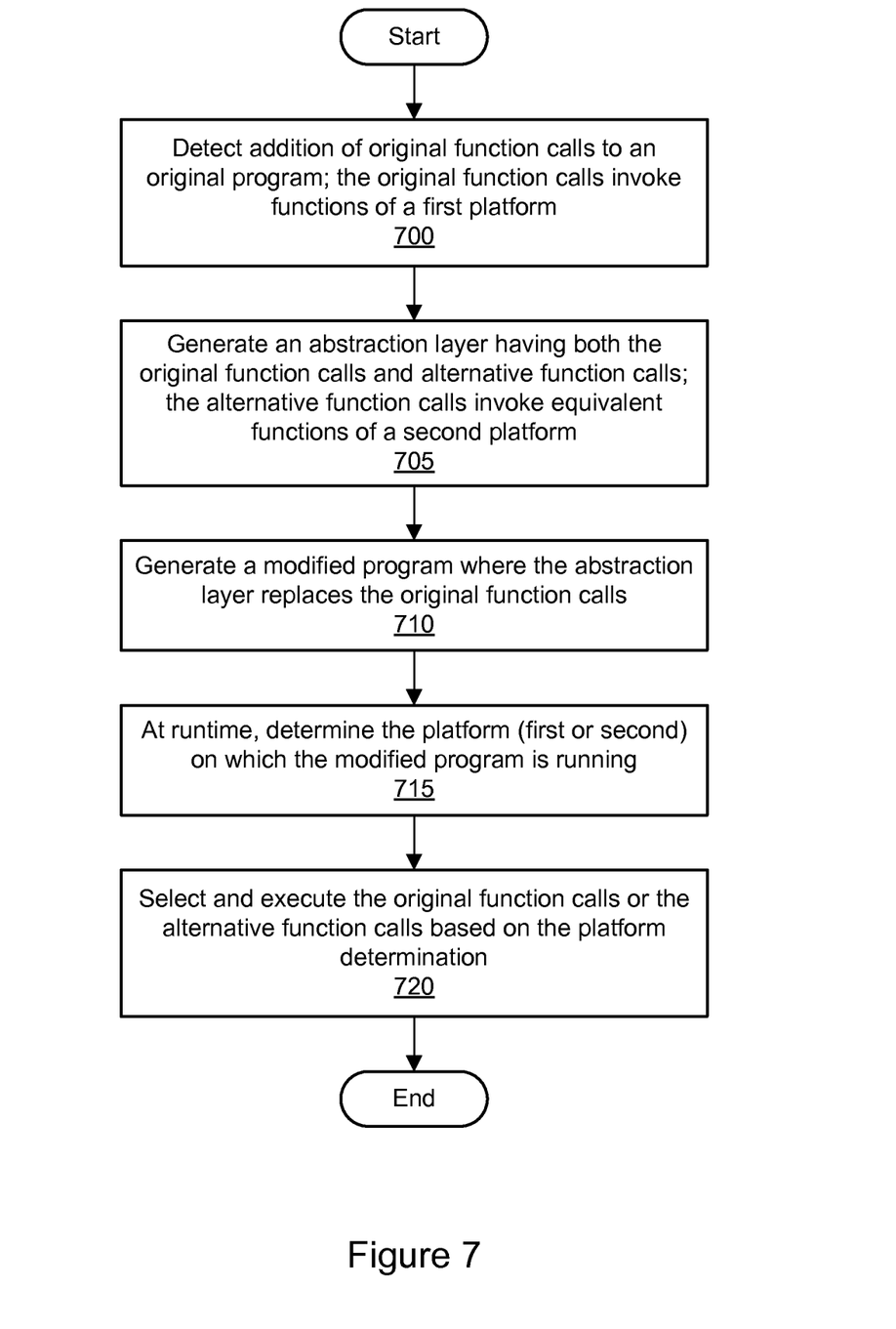
FIG. 7 is a flowchart illustrating a method for program code conversion for cross-platform compatibility, including use of an abstraction layer, according to one embodiment.

FIG. 7 is a flowchart illustrating a method for program code conversion for cross-platform compatibility, including use of an abstraction layer, according to one embodiment. As shown in 700, the addition of one or more original function calls to an original program may be detected. The original function calls may invoke functions of a first platform (e.g., APIs available on the first platform).

As shown in 705, an abstraction layer may be generated to provide cross-platform compatibility for the original function calls. The abstraction layer may include both the original function calls for a first platform and alternative function calls that invoke equivalent functions of one or more additional platforms. As shown in 710, a modified program with the abstraction layer may be generated. The abstraction layer may replace and/or augment the original function calls.

As shown in 715, when the modified program is executed on a computing device, the platform on which the program is running may be determined. As shown in 720, the original function calls or the alternative function calls may be selected from the abstraction layer and executed based on the determination of the device's platform.

Illustrative Computer System

Figure 8:
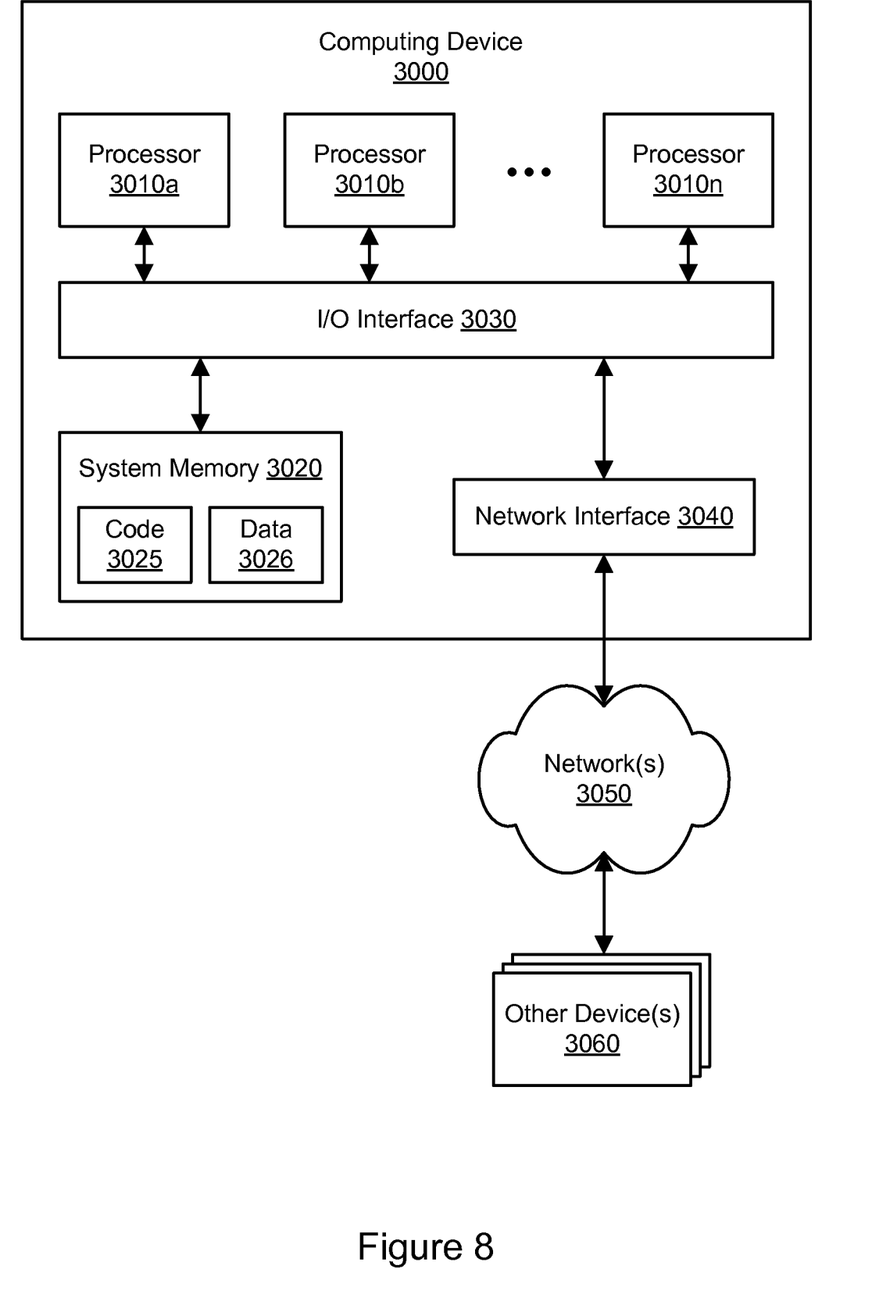
FIG. 8 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 8 illustrates such a general-purpose computing device 3000. In the illustrated embodiment, computing device 3000 includes one or more processors 3010*a*-3010*n* coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010*a* and 3010*b* through 3010*n* (e.g., two, four, eight, or another suitable number), referred to collectively as processors 3010. Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method for converting an original program to a modified program, comprising:
   identifying a plurality of original function calls in the original program, wherein the original program is targeted to a first platform, and wherein the plurality of original function calls comprise invocations of a plurality of functions implemented on the first platform;
   determining whether individual ones of the original function calls correspond to alternative function calls in an index; and
   for individual ones of the original function calls that correspond to the alternative function calls in the index, replacing the individual ones of the original function calls with corresponding ones of the alternative function calls in the modified program, wherein the modified program is targeted to a second platform, and wherein the alternative function calls comprise invocations of a plurality of functions implemented on the second platform.

2. The method as recited in claim 1, further comprising:
   converting the original program from an executable format to an intermediate format, wherein the individual ones of the original function calls are replaced with the corresponding ones of the alternative function calls in the intermediate format; and
   converting the modified program from the intermediate format to the executable format.

3. The method as recited in claim 1, wherein the index includes information indicating how to replace a particular original function call with a particular alternative function call.

4. The method as recited in claim 1, further comprising:
   listing the modified program on a software marketplace; and
   using the software marketplace to distribute the modified program to one or more client devices, wherein the one or more client devices implement the second platform.

5. The method as recited in claim 1, further comprising:
   for individual ones of the original function calls that do not correspond to alternative function calls in the index, replacing the individual ones of the original function calls with corresponding adapter libraries in the modified program.

6. The method as recited in claim 1, wherein the original program comprises original bytecode configured to run on a virtual machine, and wherein the modified program comprises modified bytecode configured to run on the virtual machine.

7. A system, comprising:
   at least one processor;
   a memory coupled to the at least one processor, wherein the memory stores program instructions, wherein the program instructions are executable by the at least one processor to:
      convert an original program to a modified program, wherein the original program is targeted to a first platform, wherein the modified program is targeted to a second platform, and wherein the program instructions are executable by the at least one processor to:
         identify a plurality of original function calls in the original program, wherein the plurality of original function calls comprise invocations of a plurality of functions implemented on the first platform;
         determine whether individual ones of the original function calls correspond to alternative function calls in a transmutation index; and
         for individual ones of the original function calls that correspond to the alternative function calls in the transmutation index, replace the individual ones of the original function calls with corresponding ones of the alternative function calls, wherein the alternative function calls comprise invocations of a plurality of functions implemented on the second platform; and
      use a software marketplace to distribute the modified program to one or more client devices, wherein the one or more client devices implement the second platform.

8. The system as recited in claim 1, wherein, in converting the original program to the modified program, the program instructions are executable by the at least one processor to:
   convert the original program from a bytecode format to an intermediate format, wherein the individual ones of the original function calls are replaced with the corresponding ones of the alternative function calls in the intermediate format; and
   convert the modified program from the intermediate format to the bytecode format.

9. The system as recited in claim 1, wherein, in converting the original program to the modified program, the program instructions are executable by the at least one processor to:
   convert a type or format of one or more parameters of individual ones of the original function calls.

10. The system as recited in claim 1, wherein, in converting the original program to the modified program, the program instructions are executable by the at least one processor to:
    for individual ones of the original function calls that do not correspond to alternative function calls in the transmutation index, replacing the individual ones of the original function calls with corresponding adapter libraries in the modified program.

11. A computer-implemented method, comprising:
    initiating execution of a program on a computing device, wherein the program is targeted to a first platform, and wherein the computing device implements a second platform;
    during the execution of the program, identifying one or more original function calls in the program, wherein the one or more original function calls comprise invocations of one or more functions implemented on the first platform, and wherein the one or more original function calls comprise one or more original bytecode sequences configured to run on a virtual machine;
    during the execution of the program, substituting one or more alternative function calls for individual ones of the original function calls based at least in part on a transmutation index, wherein the one or more alternative function calls comprise invocations of one or more functions implemented on the second platform, wherein the one or more alternative function calls comprise one or more alternative bytecode sequences configured to run on the virtual machine, and wherein the one or more alternative function calls are substituted for the individual ones of the original function calls using a just-in-time technique; and
    executing individual ones of the one or more alternative function calls on the computing device instead of the corresponding original function calls.

12. The method as recited in claim 11, further comprising:
    storing the one or more alternative function calls in a cache memory on the computing device.

13. The method as recited in claim 12, further comprising:
    initiating a second execution of the program on the computing device;
    during the second execution of the program, retrieving the one or more alternative function calls from the cache memory; and
    during the second execution of the program, executing individual ones of the one or more alternative function calls on the computing device instead of the corresponding original function calls.

14. The method as recited in claim 11, further comprising:
    using a lookup table to find individual ones of the alternative function calls corresponding to individual ones of the original function calls, wherein the lookup table is stored in a memory of the computing device.

15. The method as recited in claim 11, further comprising:
    after the execution of the program, storing an unmodified version of the program and the one or more substituted alternative function calls in a memory of the computing device.

16. The method as recited in claim 11, wherein the one or more original function calls comprise one or more original bytecode sequences configured to run on a virtual machine, and wherein the one or more alternative function calls comprise one or more alternative bytecode sequences configured to run on the virtual machine.

17. A non-transitory computer-readable storage medium storing program instructions computer-executable to cause one or more processors to perform:
    detecting an addition of one or more original function calls to an original computer program during development of the original computer program, wherein the one or more original function calls comprise invocations of one or more functions implemented on a first platform, wherein development of the original computer program is monitored for changes;
    in response to detecting the addition of the one or more original function calls to the original computer program during development of the original computer program, determining one or more alternative function calls comprising invocations of one or more functions implemented on a second platform that are functionally equivalent to the one or more original function calls;
    generating an abstraction layer comprising the one or more original function calls, the one or more alternative function calls, and information correlating each of the one or more original function calls to corresponding ones of the one or more alternative function calls; and receiving user input comprising approval of the replacing the one or more original function calls with the abstraction layer;

in response to the user input, generating a modified computer program based on the original computer program, comprising replacing the one or more original function calls with the abstraction layer, wherein the modified computer program is configured to select the one or more original function calls or the corresponding one or more alternative function calls from the abstraction layer at runtime based on whether the modified computer program is executing on the first platform or the second platform.

18. The non-transitory computer-readable storage medium as recited in claim 17, wherein the program instructions are computer-executable to cause the one or more processors to perform:

submitting the modified computer program to a first software marketplace serving a plurality of devices that implement the first platform; and submitting the modified computer program to a second software marketplace serving a plurality of devices that implement the second platform.

19. The non-transitory computer-readable storage medium as recited in claim 17, wherein the program instructions are computer-executable to cause the one or more processors to perform:

prompting a developer for approval or disapproval of the replacing the one or more original function calls with the abstraction layer.

20. The non-transitory computer-readable storage medium as recited in claim 18, wherein the program instructions are computer-executable to cause the one or more processors to perform:

determining whether the modified computer program conforms to one or more standards set by an operator of the first software marketplace.

* * * * *